(12) United States Patent
Zou et al.

(10) Patent No.: US 12,117,370 B1
(45) Date of Patent: Oct. 15, 2024

(54) PHYSICAL SIMULATION TEST SYSTEM FOR STUDYING TUNNEL STRUCTURE UNDER ACTIVE FAULT MOVEMENTS

(71) Applicant: Institute of Geology and Geophysics, Chinese Academy of Sciences, Beijing (CN)

(72) Inventors: Yu Zou, Beijing (CN); Chunling Liu, Beijing (CN); Guangming Luo, Xingning (CN); Shengwen Qi, Beijing (CN); Songfeng Guo, Beijing (CN); Bowen Zheng, Beijing (CN); Yongchao Li, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/739,342

(22) Filed: Jun. 11, 2024

(30) Foreign Application Priority Data

Jan. 29, 2024 (CN) .......................... 202410114319.0

(51) Int. Cl.
*G01M 5/00* (2006.01)
*G01N 3/08* (2006.01)
(52) U.S. Cl.
CPC ................ *G01M 5/00* (2013.01); *G01N 3/08* (2013.01); *G01N 2203/0246* (2013.01)

(58) Field of Classification Search
CPC .... G01M 5/00; G01N 3/08; G01N 2203/0246
See application file for complete search history.

(56) References Cited

U.S. PATENT DOCUMENTS

| | | | |
|---|---|---|---|
| 11,047,782 B1* | 6/2021 | Zheng ...................... | G01N 3/04 |
| 11,085,859 B1* | 8/2021 | Zou ........................... | E21D 9/00 |
| 11,579,055 B2* | 2/2023 | Li .............................. | G01N 3/02 |
| 11,650,135 B2* | 5/2023 | Chen ................... | G01M 5/0058 |
| | | | 73/865.6 |
| 11,835,431 B1* | 12/2023 | Zhang .................. | G01M 99/008 |
| 2019/0383714 A1* | 12/2019 | Li ............................ | G01N 3/12 |

* cited by examiner

*Primary Examiner* — Freddie Kirkland, III

(57) ABSTRACT

A physical simulation test system for studying a tunnel structure under active fault movements includes: a simulation box, a loading frame, a first loading mechanism, a second loading mechanism and a third loading mechanism. The simulation box is a hollow and open box structure including a first box and a second box that can slide relative to each other. The loading frame includes a crossbeam, a first bracket, a second bracket, and a third bracket. The simulation box is located below the crossbeam, between the first bracket and the second bracket, and in front of the third bracket. The first loading mechanism is disposed on the first bracket, the second loading mechanism is located below the first box, and the third loading mechanism is disposed on the third bracket. The three loading mechanisms are configured to provide loading forces in three different directions to the first box.

10 Claims, 3 Drawing Sheets

PHYSICAL SIMULATION TEST SYSTEM FOR STUDYING TUNNEL STRUCTURE UNDER ACTIVE FAULT MOVEMENTS

TECHNICAL FIELD

The present disclosure relates to the field of rock engineering geomechanics testing technology, and particularly to a physical simulation test system for studying a tunnel structure under active fault movements.

BACKGROUND

China implements the Belt and Road initiative, and areas crossed by the Belt and Road initiative is highly coincident with the Eurasian seismic belt, and thus a lot of engineering is implemented in active tectonic areas. In fact, in the construction of previous engineering, it is necessary to perform stability evaluations on engineering areas, and major engineering should try to avoid active faults as much as possible. But now, due to national strategic needs, a lot of major engineering have been planned in the active tectonic areas, making the engineering impossible to avoid active faults. Active fault dynamic disasters in the active tectonic areas threaten the construction of engineering and the safety of people's lives and property.

Secondary disasters caused by fault movements include earthquakes, landslides, surface ruptures, and other problems. Types of faults are complex, including not only exposed faults on the surface, but also hidden faults. There are various possible causes of hidden faults, such as faults that cut through the bedrock being covered by new sediments, or faults being occupied by intrusive rock masses, or blind faults formed deep underground without cutting through the fault plane to the surface. The law of surface deformation caused by fault movements is still unclear, and a main reason is the lack of physical simulation testing equipment that can accurately characterize the characteristics of fault movements, making it impossible to carry out relevant physical model tests.

The present disclosure provides a device for physically simulating different forms and mechanisms of active faults movements, with the aim of improving the accuracy of physical simulation tests for simulating active faults.

SUMMARY

To improve the accuracy of physical simulation tests for simulating active faults, the present disclosure provides a physical simulation test system for studying a tunnel structure under active fault movements. The physical simulation test system includes a simulation box and a loading frame.

The simulation box is a hollow and open box structure; and the simulation box includes a first box and a second box; the first box and the second box are configured to slide relative to each other; the simulation box is configured to accommodate a simulation material; and the second box is fixed to ground through a support device.

The physical simulation test system further includes: a first support plate and a second support plate located below the first box; the first support plate is connected to the second support plate through a support part; a top of the first support plate and a top of the second support plate abut against a bottom panel of the first box; and the first support plate and the second support plate are configured to support the first box, thereby aligning the first box with the second box.

The loading frame includes:
a crossbeam,
a first bracket; where a top end of the first bracket is fixed to a left end of the crossbeam, and a bottom end of the first bracket is fixed to the ground;
a second bracket; where a top end of the second bracket is fixed to a right end of the crossbeam, and a bottom end of the second bracket is fixed to the ground; and
a third bracket; where the third bracket is in an inverted L-shape, an end of the third bracket is fixed to a rear end of the crossbeam, and a bottom end of the third bracket is fixed to the ground;
where the simulation box is located below the crossbeam, the simulation box is located between the first bracket and the second bracket, and the simulation box is located in front of the third bracket.

The physical simulation test system further includes:
a first loading mechanism; where the first loading mechanism is disposed on the first bracket, and the first loading mechanism is configured to provide a horizontal loading force in a right direction to the first box, thereby controlling a balance of horizontal forces applied to the first box;
a second loading mechanism; where the second loading mechanism is located at a bottom of the first box, the second loading mechanism is configured to provide a vertical loading force to the first box; and
a third loading mechanism; where the third loading mechanism is disposed on the third bracket, and the third loading mechanism is configured to provide a horizontal loading force in a forward direction to the first box.

In an embodiment, the first support plate and the second support plate are extendable or detachable structures; the first support plate and the support plate are capable of being locked to support the first box, and being unlocked to make the first box slides downwards relative to the second box under an action of gravity.

In an embodiment, a contact surface of the first box and a contact surface of the second box are inclined to each other. The first box is capable of sliding relative to the contact surface of the second box under a loading force of the first loading mechanism, the second loading mechanism, or the third loading mechanism.

In an embodiment, the first loading mechanism includes:
a first base; where the first base is disposed on the first bracket;
a first output shaft; where the first output shaft abuts against a side panel of the first box; and
a first driving assembly, where the first driving assembly is fixed on the first base and is configured to drive the first output shaft to extend or retract;
in a case that a first sliding rail is disposed at a contact position between the first output shaft and the side panel of the first box, when the first output shaft is extended to push the first box to slide relative to the second box, the first output shaft slides on the first sliding rail; or
in a case that the first output shaft is fixed to the side panel of the first box, a second sliding rail is disposed at a contact position between the first base and the first bracket, when the first output shaft is extended to push the first box to slide relative to the second box, the first base drives the first loading mechanism to slide along the second sliding rail.

In an embodiment, the second loading mechanism includes:
- a second base; where the second base is fixed on the support part;
- a second output shaft; where the second output shaft is provided with a first sample frame, the first sample frame is configured to accommodate a first loading rock sample, a second loading rock sample and a third loading rock sample are respectively placed on two sides of the first sample frame; and
- a second driving assembly; where the second driving assembly includes a vertical driving unit, a first horizontal driving unit, and a second horizontal driving unit; the second loading rock sample and the third loading rock sample respectively clamp the first loading rock sample under a driving force of the first horizontal driving unit and a driving force of the second horizontal driving unit; the vertical driving unit is fixed on the second base; and the vertical driving unit is configured to drive the second output shaft to extend or retract, thereby driving the first loading rock sample to provide the vertical loading force to the first box.

In an embodiment, the first horizontal driving unit is fixed on the first support plate, and the first horizontal driving unit is configured to apply a driving force to the second loading rock sample; and the second horizontal driving unit is fixed on the second support plate, and the second horizontal driving unit is configured to apply a driving force to the third loading rock sample.

In an embodiment, the third loading mechanism includes:
- a third base; where the third base is fixed on the third bracket;
- a third output shaft; where the third output shat is provided with a second sample frame; the second sample frame is configured to place a fourth loading rock sample; and a fifth loading rock sample and a sixth loading rock sample are respectively placed on two sides of the second sample frame; and
- a third driving assembly; where the third driving assembly includes a forward-backward driving unit, a third horizontal driving unit, and a fourth horizontal driving unit; the fifth loading rock sample and the sixth loading rock sample respectively clamp the fourth loading rock sample under a driving force of the third horizontal driving unit and a driving force of the fourth horizontal driving unit; the forward-backward driving unit is fixed on the third base; and the forward-backward driving unit is configured to drive the third output shaft to extend or retract, thereby driving the fourth loading rock sample to provide the horizontal loading force in the forward direction to the first box.

In an embodiment, the physical simulation test system further includes: cantilevers disposed on the third bracket; the cantilevers include a first cantilever and a second cantilever disposed opposite to each other. An end of the first cantilever is fixed to a left side of the third bracket, and the other end of the first cantilever extends vertically to the third loading mechanism; an end of the second cantilever is fixed to a right side of the third bracket, and the other end of the second cantilever extends vertically to the third loading mechanism. The third horizontal driving unit is fixed on the first cantilever, and the third horizontal driving unit is configured to apply a driving force to the fifth loaded rock sample; and the fourth horizontal driving unit is fixed on the second cantilever, and the fourth horizontal driving unit is configured to apply a driving force to the sixth loading rock sample.

In an embodiment, the physical simulation test system further includes: a fourth loading mechanism and cover plates. The cover plates are configured to cover the simulation material in the simulation box; the cover plates include a first cover plate and a second cover plate spliced together; the first cover plate is configured to cover a surface of the simulation material in the first box; and the second cover plate is configured to cover a surface of the simulation material in the second box.

In an embodiment, the fourth loading mechanism is configured to apply a downward loading force to the cover plate, thereby enabling the first box to slide downward relative to the second box. The fourth loading mechanism is a pneumatic mechanism or a hydraulic mechanism; and the fourth loading mechanism is configured to respectively apply a downward loading force to the first cover plate and a downward loading force to the second cover plate.

The technical solution provided by the present disclosure may include the following beneficial effects. In the physical simulation test system for studying a tunnel structure under active fault movements is provided in the present disclosure, by setting the loading frame, the simulation box, and at least three loading mechanisms, the physical simulation test system can fit with various sizes of simulation boxes to achieve physical simulation tests under active faults with different motion forms (creep slip and stick slip) and different motion mechanisms (i.e., normal faults, reverse faults, and strike-slip faults). By using a digital speckle correlation method, a high-speed camera, and optical frequency domain reflection technology, fine simulations of three-dimensional deformation through dual-box compression-shear faulting can be achieved, thereby further improving the accuracy of the simulation box physical simulation test. The rock samples in the present disclosure can be replaced according to geological conditions of different regions. By replacing samples with different rock types and structural plane characteristics, various stick slip movement effects can be obtained. The present disclosure can provide reliable experimental reference and guidance data for tunnel construction in different areas.

The general description above and the detailed description in the following text are only illustrative and explanatory, and cannot limit the present disclosure.

BRIEF DESCRIPTION OF DRAWINGS

By combining the drawings to provide a more detailed description of exemplary embodiments of the present disclosure, purposes, features, and advantages of the present disclosure will become more apparent. Furthermore, in the exemplary embodiments of the present disclosure, the same reference numerals usually represent the same component.

DETAILED DESCRIPTION OF EMBODIMENTS

Figure 1:
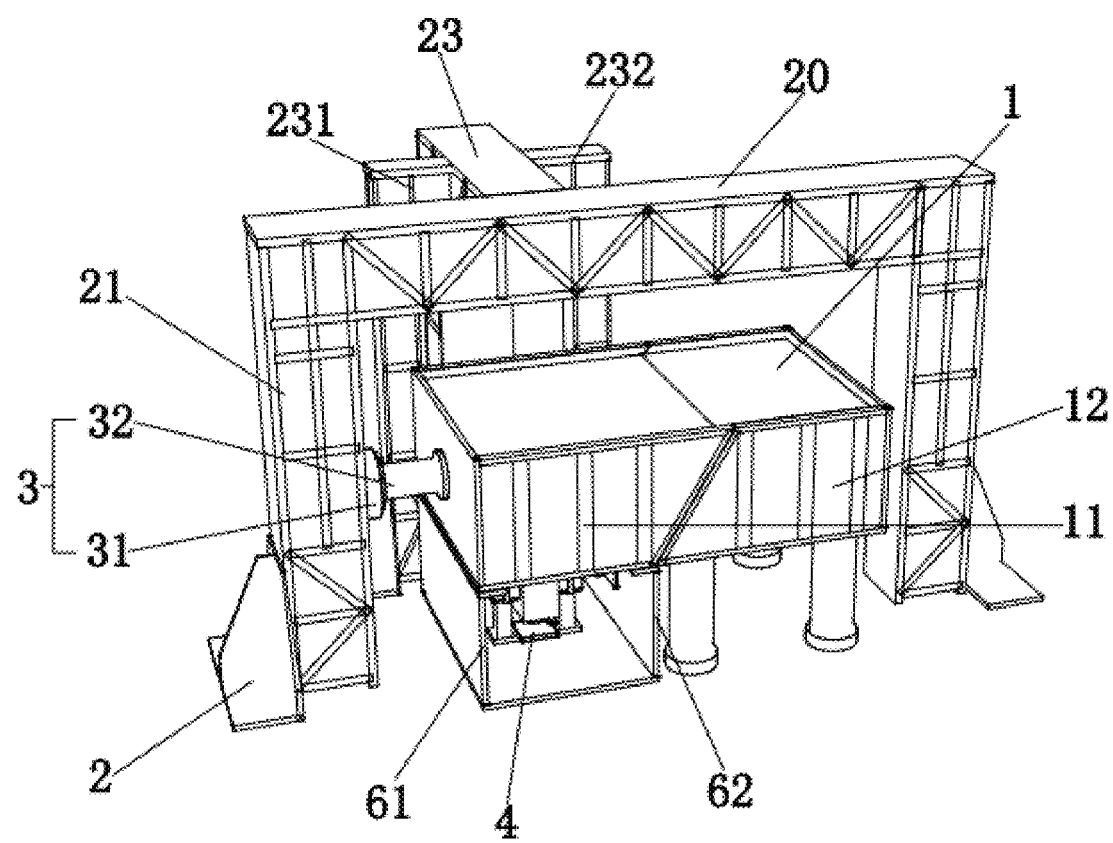
FIG. 1 illustrates an overall structural view of a physical simulation test system for studying a tunnel structure under active fault movements in an embodiment of the present disclosure.

Exemplary embodiments of the present disclosure will be described in detail with reference to the drawings. While the exemplary embodiments of the present disclosure are shown in the drawings, it is to be understood that the present disclosure may be embodied in various forms and should not be limited to the embodiments set forth herein. On the contrary, these embodiments are provided to make the present disclosure easy to understand, and these embodiments will fully convey the scope of the present disclosure to those skilled in the art.

Terms used in the present disclosure are for the purpose of describing specific embodiments only and are not intended to limit the present disclosure. As used in the present disclosure and the claims, singular forms such as "a", "said", and "the" are intended to include the plural forms as well, unless the context clearly dictates otherwise. It should also be understood that the term "and/or" as used herein refers to encompasses any possible combinations of one or more of the associated listed items.

It should be understood that various information may be described using terms such as "first", "second", "third" and the like in the present disclosure, but such information should not be limited to these terms. These terms are only used to distinguish information of the same type from each other. For example, without departing from the scope of the present disclosure, a first information may also be referred to as a second information, and similarly, the second information may also be referred to as the first information. Therefore, features described with "first" and "second" can explicitly or implicitly include one or more of these features. In the description of the present disclosure, "multiple" means two or more, unless otherwise specified.

The present disclosure intends to disclose a device for physically simulating different forms and mechanisms of active fault movements, with the aim of improving the accuracy of physical simulation tests for simulating active faults. In view of this, the present disclosure provides a physical simulation test system for studying a tunnel structure under active fault movements.

Technical solutions of embodiments of the present disclosure are described in detail below with reference to the drawings.

Figure 2:
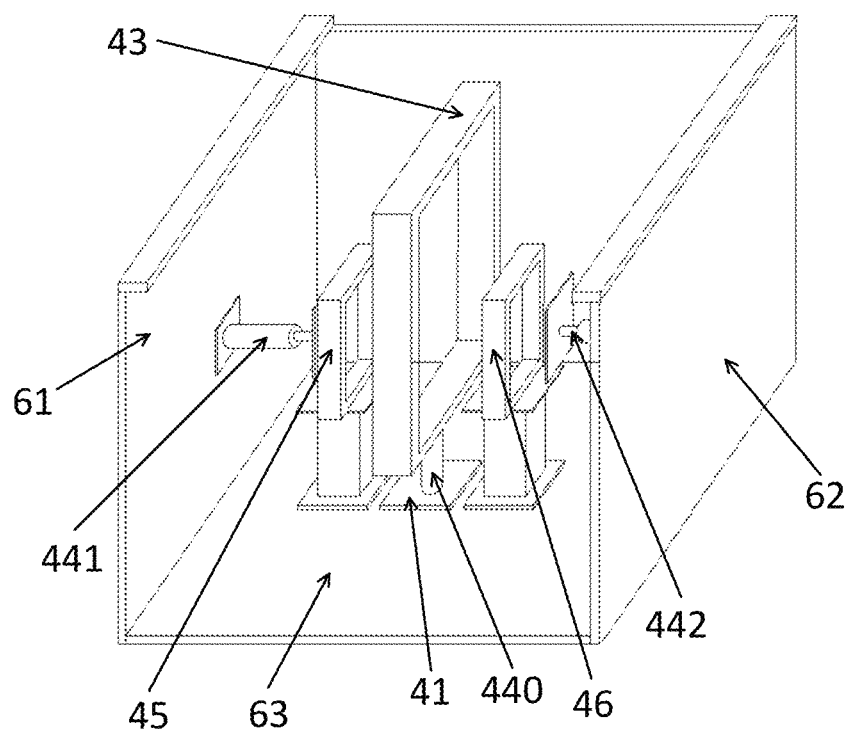
FIG. 2 illustrates an overall structural view of a second loading mechanism of the physical simulation test system for studying a tunnel structure under active fault movements in the embodiment of the present disclosure.
Figure 3:
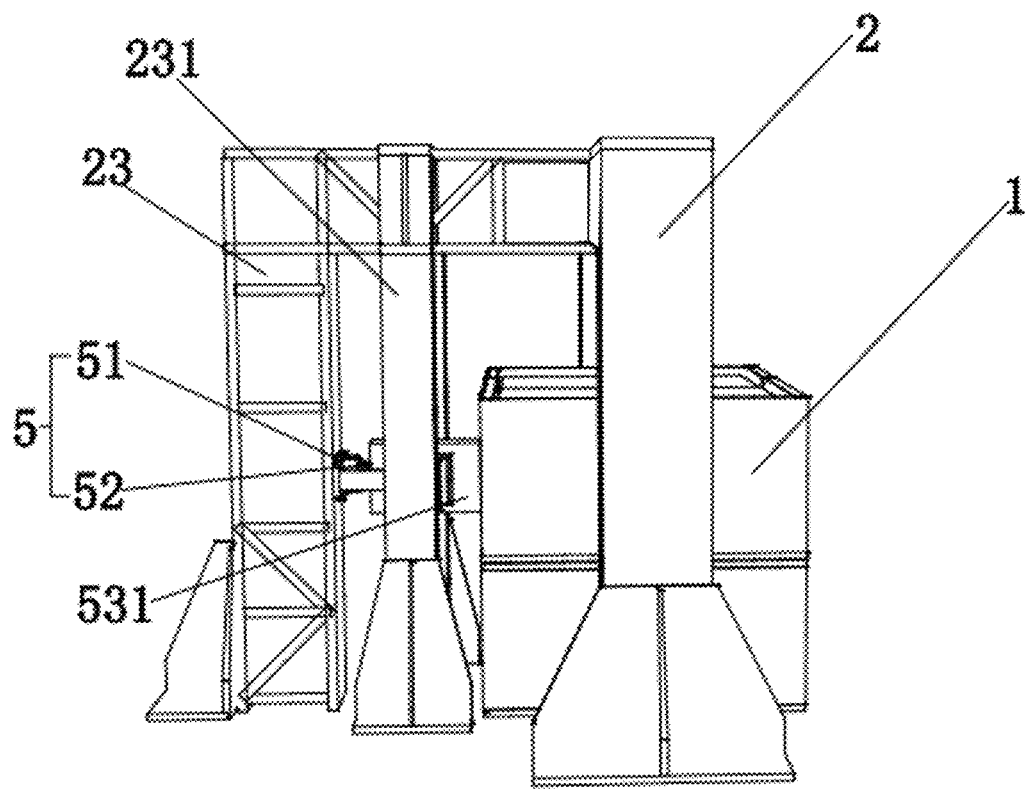
FIG. 3 illustrates a side view of the physical simulation test system for studying a tunnel structure under active fault movements in the embodiment of the present disclosure.
Figure 4:
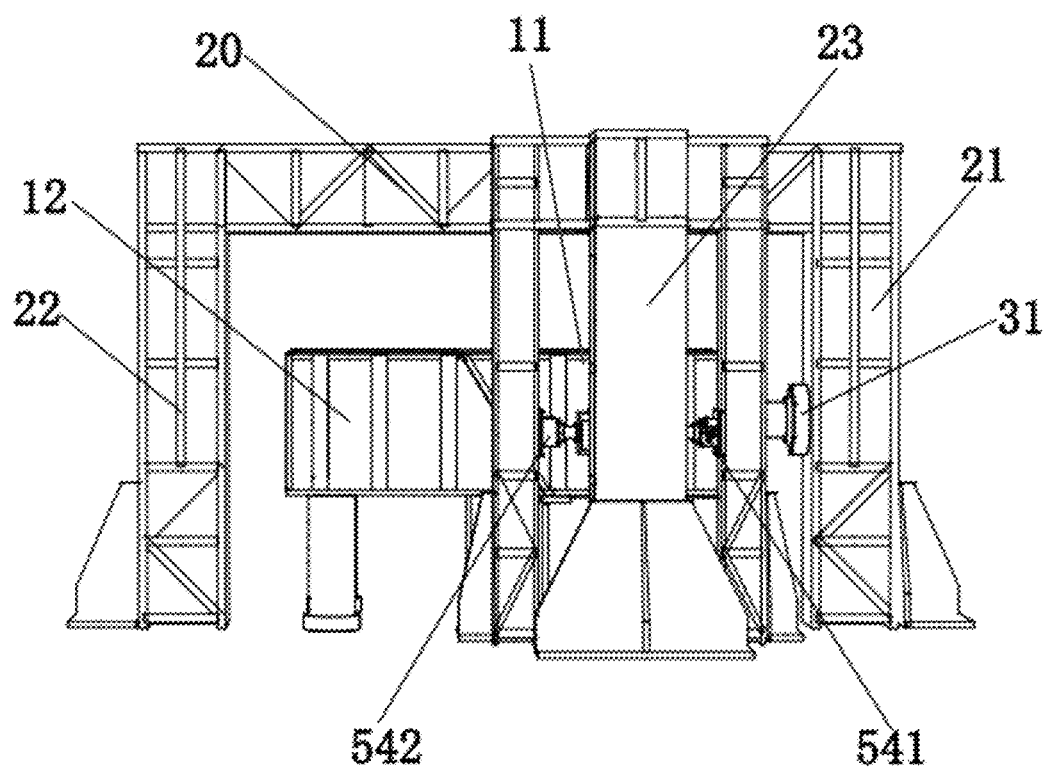
FIG. 4 illustrates a rear view of the physical simulation test system for studying a tunnel structure under active fault movements in the embodiment of the present disclosure.

FIG. 1 illustrates an overall structural view of a physical simulation test system for studying a tunnel structure under active fault movements in an embodiment of the present disclosure. FIG. 2 illustrates an overall structural view of a second loading mechanism of the physical simulation test system for studying a tunnel structure under active fault movements in the embodiment of the present disclosure. FIG. 3 illustrates a side view of the physical simulation test system for studying a tunnel structure under active fault movements in the embodiment of the present disclosure. FIG. 4 illustrates a rear view of the physical simulation test system for studying a tunnel structure under active fault movements in the embodiment of the present disclosure.

Referring to FIG. 1 to FIG. 4, the physical simulation test system provided by the present disclosure mainly includes a simulation box 1 and a loading frame 2.

The simulation box 1 is a hollow and open box structure. The simulation box includes a first box 11 and a second box 12. The simulation box 1 is configured to accommodate a simulation material. Specifically, the first box 11 includes a first front plate, a first rear plate, a first side plate, and a first bottom plate. The second box 12 includes a second front plate, a second rear plate, and a second bottom plate. The first side plate and the second side plate are arranged opposite to each other. Contact surfaces between the first box 11 and the second box 12 are inclined to each other, that is, the contact surface of the first box 11 and the contact surface of the second box 12 are inclined. The first box 11 and the second box 12 are horizontally arranged left and right. A left half box is located between a side of the second box 12 facing away from the second side plate and an inner surface of the first box 11. A right half box is located between a side of the first box 11 facing away from the second side plate and an inner surface of the second box 12. The left half box and the right half box are combined to form a hollow box having an opening on its top, and the hollow box provides a place to place the simulation material (such as surrounding rock masses and similar materials for tunnel engineering). In an embodiment, the second box 12 is fixed on the ground through a support device. For example, the support device includes several support columns, and the several support columns can be used. An end of each support column fixed to the ground and the other end of each support column is fixed to a bottom of the second box 12, thereby achieving the purpose of fixing the second box 12. In an embodiment, a limiting slide rail can be set at the contact surfaces between the first box 11 and the second box 12 to prevent them from detaching. In this way, the first box 11 can slide along the contact surfaces under the action of gravity. Those skilled in the art can adjust angles of the inclined surfaces (i.e., the contact surfaces between the first box 11 and the second box 12) according to actual needs, and the limiting slide rail between the contact surfaces can also be set according to actual needs, thereby achieving that the first box 11 can slide up, slide down, slide left, and slide right along the inclined surfaces relative to the second box 12. In other words, when the inclined surfaces are viewed as horizontal surfaces, sliding up, down, left, and right along the inclined surfaces means sliding along east, west, north, and south directions of the inclined surfaces.

The loading frame includes a crossbeam 20, a first bracket 21, a second bracket 22, and a third bracket 23. A top end of the first bracket 21 is fixed to a left end of the crossbeam 20, and a bottom end of the first bracket 21 is fixed to the ground. A top end of the second bracket 22 is fixed to a right end of the crossbeam 20, and a bottom end of the second bracket 22 is fixed to the ground. The third bracket 23 is in an inverted L-shape, an end of the third bracket 23 is fixed to a rear end of the crossbeam 20, and a bottom end of the third bracket 23 is fixed to the ground. Specifically, an end of a short beam of the third bracket 23 is fixed to a rear end of the crossbeam 20, an end of a long beam of the third bracket 23 is fixed to the ground. In some embodiments, based on actual needs, an end of the long beam of the third bracket 23 can be fixed to the rear end of the crossbeam 20, and an end of the short beam of the third bracket 23 can be fixed to the ground. The simulation box 1 is located below the crossbeam 20, the simulation box 1 is located between the first bracket 21 and the second bracket 22, and the simulation box 1 is located in front of the third bracket 23. In this way, the loading frame 2 can surround the simulation box 1 through the three brackets.

Furthermore, the physical simulation test system further includes: a first loading mechanism 3, a second loading mechanism 4, and a third loading mechanism 5. The first loading mechanism 3, the second loading mechanism 4, and the third loading mechanism 5 can be lifting-extending devices driven by electricity, gas, or liquid, or other devices that can provide output forces. The embodiment takes lifting-extending devices driven by a servo motor as an example for explanation.

The first loading mechanism 3 is disposed on the first bracket 21, and the first loading mechanism 3 is configured to provide a horizontal loading force in a right direction to the first box 11, thereby controlling a balance of horizontal forces applied to the first box 11. Specifically, the first loading mechanism 3 includes a first base 31, a first output shaft 32, and a first driving assembly. The first base 31 is fixed to an inner side (i.e., a side opposite a left panel of the first box 11) of the first bracket 21. The first output shaft 32 is against a side panel (i.e., the first side panel) of the first box 11. The first driving assembly is fixed on the first base 31 and is configured to drive the first output shaft 32 to extend or retract. In an embodiment, a first sliding rail is disposed at a contact position between the first output shaft 32 and the side panel of the first box 11, the first output shaft 32 is against the first sliding rail, and the first output shaft 32 can slide on the first sliding rail. In this way, during a process that the first driving assembly drives the first output shaft 32 to extend and push the first box 11, the first box 11 will slide relative to the second box 12. As the sliding process involves the first box 11 sliding along inclined surfaces between the first box 11 and the second box 12, that is, a sliding direction of the second box 11 is in an upper-right direction. The sliding rail can prevent the first output shaft 32 from displacement vertically, thereby applying a loading force to the first box 11 in the same horizontal direction. In another embodiment, the first output shaft 32 is fixed to the side panel of the first box 11, a sliding rail is provided on an inner side of the first bracket 21, and the first base 31 is disposed on the sliding rail; during a process that the first driving assembly drives the first output shaft 32 to extend to push the first box 11, the first output shaft 32 will slide upward with the first box 11; at the same time, the first base 31 will slide upward along the sliding rail provided on the inner side of the first bracket 21, thereby ensuring that the first output shaft 32 does not produce vertical displacement relative to the first box 11. The specific structure of the sliding rail is not shown in the figures, and those skilled in the art can set a suitable sliding rail according to actual needs, such as a rail formed by two smooth steel sheets, or some rolling balls can be set on the two smooth steel sheets. The embodiments will not be explained in detail.

The second loading mechanism 4 is disposed at a bottom of the first box 11, and the second loading mechanism 4 is configured to provide a vertical loading force to the first box 11. Specifically, the second loading mechanism 4 includes a second base 41, a second output shaft, and a second driving assembly. In some embodiment, the second base 41 can be fixed to a support part (the following text will explain the support part), or the second base 41 can be fixed to the ground. The second output shaft is provided with a first sample frame 43, the first sample frame 43 is configured to accommodate a first loading rock sample, a second loading rock sample and a third loading rock sample are respectively placed on two sides of the first sample frame 43. The second driving assembly includes a vertical driving unit 440, a first horizontal driving unit 441, and a second horizontal driving unit 442. Specifically, the second loading rock sample and the third loading rock sample respectively clamp the first loading rock sample under a driving force of the first horizontal driving unit 441 and a driving force of the second horizontal driving unit 442. The vertical driving unit is configured to drive the second output shaft to extend or retract, thereby driving the first loading rock sample to provide a vertical loading force to the first box 11.

In a specific embodiment, the first sample frame 43 is a rectangular sample frame. The second loading rock sample and the third loading rock sample on both sides can be placed on support platforms, and the support platforms are fixed to on the support part (the following text will explain the support part). In some embodiments, the support platforms can be fixed to the ground. Specifically, referring to FIG. 2, two rectangular sample frames (i.e., a first rectangular sample frame 45 and a second rectangular sample frame 46 in FIG. 2) can also be set on the support platforms. The second loading rock sample and the third loading rock sample are placed in two rectangular sample frames respectively. Heights of the support platforms are adjusted according to the actual needs. After the second loading rock sample and the third loading rock sample are placed in the rectangular sample frames on the support platforms, inner surfaces of the second loading rock sample and the third loading rock sample can be adhered to two sides of the first loading rock sample under the driving force of the first horizontal driving unit 441 and the driving force of the second horizontal driving unit 442.

Furthermore, the physical simulation test system further includes: a first support plate 61 and a second support plate 62 located below the first box 11. A top of the first support plate 61 and a top of the second support plate 62 are against a bottom panel of the first box 11. The first support plate 61 is connected to the second support plate 62 through a support part 63. The support part 63 can be a steel plate structure, bottom ends of the first support plate 61 and the second support plate 62 are fixed at two ends of the support part 63. The support part 63 is directly disposed on the ground, thereby ensuring that the first support plate 61 and the second support plate 62 can stably support the first box 11. In this way, as mentioned earlier, the second base 41 and the support platforms of the second loading mechanism 4 can be directly disposed on the support part 63.

Furthermore, both the first support plate 61 and the second support plate 62 are expandable structures or detachable structures. Specifically, taking the expandable structures as an example, the expandable structures can be locked to enable the first support plate 61 and the second support plate 62 to support the first box 11; and the expandable structure can be unlocked to allow the first box 11 to compress the first support plate 61 and the second support plate 62 under the action of gravity, and then the first box 11 will slide downwards. In an embodiment, each of the expandable structures can be a spring with a large elastic coefficient. When the spring is locked, the first support plate 61 and the second support plate 62 support the first box 11, so that the first box 11 can be in the same horizontal plane as the second box 12; after the spring is unlocked, the first box 11 can slide downwards relative to the second box 12 along the sliding rail under the action of gravity. An elastic coefficient of the spring can be selected according to actual needs. Taking the detachable structures as an example, the first support plate 61 and the second support plate 62 can be devices fixed by locks. When the first support plate 61 and the second support plate 62 are in a locked state, the first support plate 61 and the second support plate 62 can support the first box 11, so that the first box 11 is in the same horizontal plane as the second box 12; after the locked state is released, an upper part of the first support plate 61 and an upper part of the second support plate 62 can be removed, for example, a height of each removed part can be 10-15 centimeters (a specific removal height can be set according to actual needs). At this time, the first box 11 can slide downward along the sliding rail relative to the second box 12 along the inclined surfaces under the action of gravity.

In the embodiment, the first horizontal driving unit 441 is fixed on the first support plate 51, and the first horizontal driving unit 441 is configured to apply a driving force to the second loading rock sample. The second horizontal driving unit 442 is fixed on the second support plate 62, and the second horizontal driving unit 442 is configured to apply a driving force to the third loading rock sample.

The third loading mechanism 5 is disposed on the third bracket 23, and the third loading mechanism 5 is configured to provide a horizontal loading force in a forward direction to the first box 11. The third loading mechanism 5 includes a third base 51, a third output shaft 52, and a third driving assembly. The third base 51 is fixed on an inner side (i.e., a side opposite to a rear panel of the first box 11) of the third bracket 23. The third output shat 52 is provided with a second sample frame (not shown in figures). The second sample frame is configured to place a fourth loading rock sample 531. A fifth loading rock sample and a sixth loading rock sample are respectively placed on two sides of the second sample frame. The third driving assembly includes a forward-backward driving unit, a third horizontal driving unit 541, and a fourth horizontal driving unit 542. The fifth loading rock sample and the sixth loading rock sample respectively clamp the fourth loading rock sample 531 under a driving force of the third horizontal driving unit 541 and a driving force of the fourth horizontal driving unit 542. The forward-backward driving unit is configured to drive the third output shaft 52 to extend or retract, thereby driving the fourth loading rock sample 531 to provide a horizontal loading force in the forward direction to the first box 11.

In a specific embodiment, the second sample frame is a rectangular sample frame. The fifth loading rock sample and the sixth loading rock sample on the two sides of the second sample frame can be placed respectively on support platforms, and the support platforms are fixed to an inner side of the third bracket 23. Specifically, two rectangular sample frames can be fixed on the support platforms, while the fifth loading rock sample and the sixth loading rock sample can be placed in the two rectangular sample frames respectively. Lengths of the support platforms are adjusted according to the actual needs. After the fifth loading rock sample and the sixth loading rock sample are placed in the rectangular sample frames on the support platforms, inner surfaces of the fifth loading rock sample and the sixth loading rock sample can be adhered to two sides of the fourth loading rock sample under a driving force of the third horizontal driving unit 541 and a driving force of the fourth horizontal driving unit 542.

Furthermore, the physical simulation test system further includes: cantilevers disposed on the third bracket 23. The cantilevers include a first cantilever 231 and a second cantilever 232 disposed relative to each other. Specifically, an end of the first cantilever 231 is fixed to a left side of the third bracket 23, and the other end of the first cantilever 231 extends vertically to the third loading mechanism 5. An end of the second cantilever 232 is fixed to a right side of the third bracket 23, and the other end of the second cantilever extends 232 vertically to the third loading mechanism 5. The third horizontal driving unit 541 is fixed on the first cantilever 231, and the third horizontal driving unit 541 is configured to apply a driving force to the fifth loaded rock sample. The fourth horizontal driving unit 542 is fixed on the second cantilever 232, and the fourth horizontal driving unit 542 is configured to apply a driving force to the sixth loading rock sample.

It can be understood by those skilled in the art that the first box 11 and the second box 12 in the embodiment of the present disclosure are spliced and aligned in the horizontal direction. According to the actual needs, in an embodiment, the first box 11 can be fixed and the second box body 12 can be slidden; in other embodiments, the second box 12 can be fixed and the first box 11 can be slidden; and the two ways do not affect the test results. For the convenience of description, the present disclosure takes a way that the second box 12 is fixed and a loading force is applied to the first box 11 (i.e., the first box 11 can be slidden) as an example for description.

The physical simulation test system provided by the present disclosure achieve physical simulation tests under active faults with different motion forms and different motion mechanisms, and the physical simulation test system can achieve accurate simulations of three-dimensional deformation of two boxes (i.e., the first box 11 and the second box 12) under active fault movements. Generally, the active faults have two motion forms including creep slip and stick slip, and the active faults have three motion mechanisms including normal faults, reverse faults, and strike-slip faults.

In a test of simulating the reverse faults, according to the test requirements, a tunnel structure model and structures inside the tunnel structure model are made, and sensors such as strain gauges and soil pressure boxes are arranged according to specific requirements. A suitable simulation material for simulating surrounding rock is selected, the simulation material is laid layer by layer in the simulation box 1, and the tunnel structure model is placed at a middle position inside the simulation box 1 according to the actual working conditions. According to a simulated burial depth, a layer of heavy sand can also be laid on a surface of the simulation material or a burial depth pressure can be increased by increasing the overlying pressure. Then the first loading rock sample is placed in the first sample frame. The second loading rock sample and the third loading rock sample are placed in the rectangular sample frames on the supporting platforms, then the positions of the rock samples are adjusted, so that the second loading rock sample and the third loading rock sample are in close contact with the first loading rock sample in the middle. Then, driving forces are applied to the second loading rock sample and the third loading rock sample by adjusting the first horizontal driving unit 441 and the second horizontal driving unit 442, thereby clamping the first loading rock sample. By setting the variable friction coefficients of the contact surfaces among the first loading rock sample, the second loading rock sample, and the third loading rock sample (those skilled in the art can choose or make the first loading rock sample, the second loading rock sample, and the third loading rock sample according to actual needs to achieve the required friction coefficients for the test), the simulation of stick slip movement is achieved when the vertical driving unit drives the second output shaft to extend. When only the first loading rock sample is set, without setting the second loading rock sample and the third loading rock sample, the simulation of creep slip movement is achieved when the vertical driving unit drives the second output shaft to extend. Through the contact between the first sample frame 43 and the first box 11, the stick slip effect is transmitted to the first box 11; at the same time, the first loading mechanism 3 is configured to apply a right force to the first box 11, thereby controllably achieving a balance of horizontal forces. The first box 11 slides upwards along the inclined surfaces under the limitation of the sliding rail, and the rock and soil inside the simulation box 1 undergo movement, thereby simulating the impact of fault movement on the tunnel structure. The test process can observe the deformation of rock and soil in real time through organic glass, and test data can be collected through sensors such as strain gauges and soil pressure boxes. In the test, the first support plate 61 and the second support plate 62 below the first box 11 are in a locked state, which cannot be compressed and are used to support the first box 11.

In a test of simulating the normal faults, according to the test requirements, a tunnel structure model and structures inside the tunnel structure model are made, and sensors such as strain gauges and soil pressure boxes are arranged according to specific requirements. A suitable simulation material for simulating surrounding rock is selected, the simulation material is laid layer by layer in the simulation box 1, and the tunnel structure model is placed at a middle position inside the simulation box 1 according to the actual working conditions. According to a simulated burial depth, a layer of heavy sand can also be laid on a surface of the simulation material or a burial depth pressure can be increased by increasing the overlying pressure. In the test, locked states of the first support plate 61 and the second support plate 62 below the first box 11 are released. When the first support plate 61 and the second support plate 62 are detachable structures, a part of plates at the upper ends of the first support plate 61 and the second support plate 62 can be removed. The second loading mechanism 4 is used to support the first box 11, so that the first box 11 and the second box 12 are in the same horizontal position. Then, the supporting force of the second loading mechanism 4 is gradually removed, and the first box 11 slides downwards along the inclined surfaces relative to the second box 12 under the action of gravity, and the rock and soil inside the simulation box 1 undergo movement, thereby simulating the impact of fault movement on the tunnel structure. The test process can observe the deformation of rock and soil in real time through organic glass, and test data can be collected through sensors such as strain gauges and soil pressure boxes.

In a test of simulating the strike-slip faults, according to the test requirements, a tunnel structure model and structures inside the tunnel structure model are made, and sensors such as strain gauges and soil pressure boxes are arranged according to specific requirements. A suitable simulation material for simulating surrounding rock is selected, the simulation material is laid layer by layer in the simulation box 1, and the tunnel structure model is placed at a middle position inside the simulation box 1 according to the actual working conditions. According to a simulated burial depth, a layer of heavy sand can also be laid on a surface of the simulation material or a burial depth pressure can be increased by increasing the overlying pressure. In the test, the first support plate 61 and the second support plate 62 below the first box 11 are in a locked state, which cannot be compressed and are used to support the first box 11. Then the fourth loading rock sample is placed in the second sample frame. The fifth loading rock sample and the sixth loading rock sample on two sides of the fourth loading rock sample are placed in the rectangular sample frames on the support platforms. The positions of the rock samples are adjusted, so that the fifth loading rock sample and the sixth loading rock sample are in close contact with the fourth loading rock sample. Then, driving forces are applied to the fifth loading rock sample and the sixth loading rock sample by adjusting the third horizontal driving unit 541 and the fourth horizontal drive unit 542, thereby clamping the fourth loading rock sample. A forward-backward driving unit is configured to push the second sample frame, the frictions between the fourth loading rock sample and the rock samples (i.e., the fifth loading rock sample and the sixth loading rock sample) produce a stick slip effect. Through the contact between the second sample frame and the first box 11, a stick slip effect is transmitted to the first box 11. The first box 11 slides forwards along the inclined surfaces under the limitation of the sliding rail, and the rock and soil inside the simulation box 1 undergo movement, thereby simulating the impact of fault movement on the tunnel structure. The test process can observe the deformation of rock and soil in real time through organic glass, and test data can be collected through sensors such as strain gauges and soil pressure boxes.

The physical simulation test system of the present disclosure uses the stick slip effect of rock structural plane shear, and uses the surface frictions between among the three samples, thereby forming a double-shear form of stick slip movement.

In a specific embodiment, the physical simulation test system further includes a fourth loading mechanism and cover plates, and the fourth loading mechanism and the cover plates are not shown in figures. In the specific embodiment, when the simulation box 1 is filled with the simulation material, the cover plates can be placed on the simulation material, and the cover plates include a first cover plate and a second cover plate spliced together. The first cover plate can cover the simulation material of the first box 11, and the second cover plate can cover the simulation material of the second box 12. That is to say, the cover plates are used to close the hollow and open box structure, and the cover plates are cut into two parts by the contact surfaces of the first box 11 and the second box 12.

The fourth loading mechanism is configured to apply a downward loading force to the cover plates, so that the simulation box 1 can be buried deeper. Specifically, the fourth loading mechanism can be set on the crossbeam 20 of the loading frame 2, and the fourth loading mechanism can be a pneumatic mechanism, a hydraulic mechanism, or a servo motor driven pressurized structure. The fourth loading mechanism can simultaneously apply a downward loading force to the first cover plate and the second cover plate. In the test of simulating the strike-slip faults, the first box 11 can not only slide downward under the action of gravity, but also slide downward under a force applied by the fourth loading mechanism. As the second box 12 is fixed to the ground by the support device, the force applied to the second cover plate is offset by a support force of the support device. The force applied to the first cover plate is transmitted to the first box 11, causing the first cover plate and the first box 11 to slide downward relative to the second box 12

In an embodiment, the physical simulation test system of the present disclosure may also include a moisture collection device, that is, during the testing process, when the simulation material in simulation box 1 undergoes movement, due to the presence of moisture in the simulation material, the moisture discharged during the movement of the simulation material can be collected through the moisture collection device as test data.

The above has described various embodiments of the present disclosure. The above explanation is illustrative and not exhaustive, and is not limited to the disclosed embodiments. Many modifications and changes are obvious to those skilled in the art, without deviating from the scope and spirit of the described embodiments. The selection of terms used in the present disclosure aims to explain the principles, practical applications, or improvements to technology in the market of each embodiment, or to enable those skilled in the art to understand the disclosed embodiments in the present disclosure.

What is claimed is:

1. A physical simulation test system for studying a tunnel structure under active fault movements, wherein the physical simulation test system comprises a simulation box and a loading frame;
   wherein the simulation box is a hollow and open box structure; and the simulation box comprises a first box and a second box; the first box and the second box are configured to slide relative to each other; the simulation box is configured to accommodate a simulation material; and the second box is fixed to ground through a support device;
   wherein the physical simulation test system further comprises: a first support plate and a second support plate located below the first box; wherein the first support plate is connected to the second support plate through a support part; a top of the first support plate and a top of the second support plate abut against a bottom panel of the first box; and the first support plate and the second support plate are configured to support the first box, thereby aligning the first box with the second box;
   wherein the loading frame comprises:
      a crossbeam,
      a first bracket; wherein a top end of the first bracket is fixed to a left end of the crossbeam, and a bottom end of the first bracket is fixed to the ground;
      a second bracket; wherein a top end of the second bracket is fixed to a right end of the crossbeam, and a bottom end of the second bracket is fixed to the ground; and
      a third bracket; wherein the third bracket is in an inverted L-shape, an end of the third bracket is fixed to a rear end of the crossbeam, and a bottom end of the third bracket is fixed to the ground;
   wherein the simulation box is located below the crossbeam, the simulation box is located between the first bracket and the second bracket, and the simulation box is located in front of the third bracket;
   wherein the physical simulation test system further comprises:
      a first loading mechanism; wherein the first loading mechanism is disposed on the first bracket, and the first loading mechanism is configured to provide a horizontal loading force in a right direction to the first box, thereby controlling a balance of horizontal forces applied to the first box;
      a second loading mechanism; wherein the second loading mechanism is located at a bottom of the first box, the second loading mechanism is configured to provide a vertical loading force to the first box; and
      a third loading mechanism; wherein the third loading mechanism is disposed on the third bracket, and the third loading mechanism is configured to provide a horizontal loading force in a forward direction to the first box.

2. The physical simulation test system as claimed in claim 1, wherein the first support plate and the second support plate are extendable or detachable structures; the first support plate and the support plate are capable of being locked to support the first box, and being unlocked to make the first box slide downwards relative to the second box under an action of gravity.

3. The physical simulation test system as claimed in claim 2, wherein a contact surface of the first box and a contact surface of the second box are inclined to each other; and
   the first box is capable of sliding relative to the second box along the contact surface of the second box under a loading force of the first loading mechanism, the second loading mechanism, or the third loading mechanism.

4. The physical simulation test system as claimed in claim 3, wherein the first loading mechanism comprises:
   a first base; wherein the first base is disposed on the first bracket;
   a first output shaft; wherein the first output shaft abuts against a side panel of the first box; and
   a first driving assembly, wherein the first driving assembly is fixed on the first base and is configured to drive the first output shaft to extend or retract;
   wherein in a case that a first sliding rail is disposed at a contact position between the first output shaft and the side panel of the first box, when the first output shaft is extended to push the first box to slide relative to the second box, the first output shaft slides on the first sliding rail; or in a case that the first output shaft is fixed to the side panel of the first box, a second sliding rail is disposed at a contact position between the first base and the first bracket, when the first output shaft is extended to push the first box to slide relative to the second box, the first base drives the first loading mechanism to slide along the second sliding rail.

5. The physical simulation test system as claimed in claim 3, wherein the second loading mechanism comprises:
   a second base; wherein the second base is fixed on the support part;
   a second output shaft; wherein the second output shaft is provided with a first sample frame, the first sample frame is configured to accommodate a first loading rock sample, a second loading rock sample and a third loading rock sample are respectively placed on two sides of the first sample frame; and
   a second driving assembly;
   wherein the second driving assembly comprises a vertical driving unit, a first horizontal driving unit, and a second horizontal driving unit; the second loading rock sample and the third loading rock sample respectively clamp the first loading rock sample under a driving force of the first horizontal driving unit and a driving force of the second horizontal driving unit; the vertical driving unit is fixed on the second base; and the vertical driving unit is configured to drive the second output shaft to extend or retract, thereby driving the first loading rock sample to provide the vertical loading force to the first box.

6. The physical simulation test system as claimed in claim 5, wherein the first horizontal driving unit is fixed on the first support plate, and the first horizontal driving unit is configured to apply a driving force to the second loading rock sample; and the second horizontal driving unit is fixed on the second support plate, and the second horizontal driving unit is configured to apply a driving force to the third loading rock sample.

7. The physical simulation test system as claimed in claim 3, wherein the third loading mechanism comprises:
   a third base; wherein the third base is fixed on the third bracket;

a third output shaft; wherein the third output shat is provided with a second sample frame; the second sample frame is configured to place a fourth loading rock sample; and a fifth loading rock sample and a sixth loading rock sample are respectively placed on two sides of the second sample frame; and a third driving assembly; wherein the third driving assembly comprises a forward-backward driving unit, a third horizontal driving unit, and a fourth horizontal driving unit; the fifth loading rock sample and the sixth loading rock sample respectively clamp the fourth loading rock sample under a driving force of the third horizontal driving unit and a driving force of the fourth horizontal driving unit; the forward-backward driving unit is fixed on the third base; and the forward-backward driving unit is configured to drive the third output shaft to extend or retract, thereby driving the fourth loading rock sample to provide the horizontal loading force in the forward direction to the first box.

8. The physical simulation test system as claimed in claim 7, wherein the physical simulation test system further comprises: cantilevers disposed on the third bracket; the cantilevers comprise a first cantilever and a second cantilever disposed opposite to each other;

wherein an end of the first cantilever is fixed to a left side of the third bracket, and the other end of the first cantilever extends vertically to the third loading mechanism; an end of the second cantilever is fixed to a right side of the third bracket, and the other end of the second cantilever extends vertically to the third loading mechanism; and wherein the third horizontal driving unit is fixed on the first cantilever, and the third horizontal driving unit is configured to apply a driving force to the fifth loaded rock sample; and the fourth horizontal driving unit is fixed on the second cantilever, and the fourth horizontal driving unit is configured to apply a driving force to the sixth loading rock sample.

9. The physical simulation test system as claimed in claim 1, wherein the physical simulation test system further comprises: a fourth loading mechanism and cover plates;

wherein the cover plates are configured to cover the simulation material in the simulation box; the cover plates comprise a first cover plate and a second cover plate spliced together; the first cover plate is configured to cover a surface of the simulation material in the first box; and the second cover plate is configured to cover a surface of the simulation material in the second box.

10. The physical simulation test system as claimed in claim 9, wherein the fourth loading mechanism is configured to apply a downward loading force to the cover plate, thereby enabling the first box to slide downward relative to the second box; and wherein the fourth loading mechanism is a pneumatic mechanism or a hydraulic mechanism; and the fourth loading mechanism is configured to apply a downward loading force to the first cover plate and a downward loading force to the second cover plate.

* * * * *